March 28, 1967 W. E. COFFER ET AL 3,311,906
REFRIGERATOR MONITORING SYSTEM
Filed Aug. 17, 1964

INVENTORS:
WILLIAM E. COFFER
ROBERT L. MILLER
JOHN SHEWAN
BY
Dawson, Tilton, Fallon, Lungmus & Alexander
ATT'YS ns # United States Patent Office 3,311,906
Patented Mar. 28, 1967

3,311,906
REFRIGERATOR MONITORING SYSTEM
William E. Coffer, Robert L. Miller, and John Shewan, Valparaiso, Ind., assignors to Ref-Con Corporation, Valparaiso, Ind., a corporation of Indiana
Filed Aug. 17, 1964, Ser. No. 389,998
4 Claims. (Cl. 340—227)

This invention relates to a refrigerator monitoring system and, more particularly, to a refrigerator having means for periodically defrosting the same.

The monitoring of refrigeration systems and the sensing of an abnormal temperature condition in display cases for frozen foods, meat, and produce cases, walk-in coolers, etc., has always been a problem. In particular, the cooling coils require defrosting periodically, and this is normally accomplished by hot gas from the compressor or electrically heating with the coolant temporarily shut off. The presence of heat within the refrigerator necessarily complicates temperature monitoring, and the provision of a system for achieving monitoring of refrigerator cases subject to periodic defrosing constitutes an important object of this invention.

Another object of the invention is to provide a monitoring or warning system for one or more refrigerator cases which is adapted to report faulty operation even during defrosting, and wherein the normal reporting circuit is used in a unique way for conditioning the system against premature warning.

Other objects and advantages of the invention may be seen in the details of construction and operation set down in this specification.

The invention is explained in conjunction with an illustrative embodiment in the accompanying drawing, in which—

Figure 1:
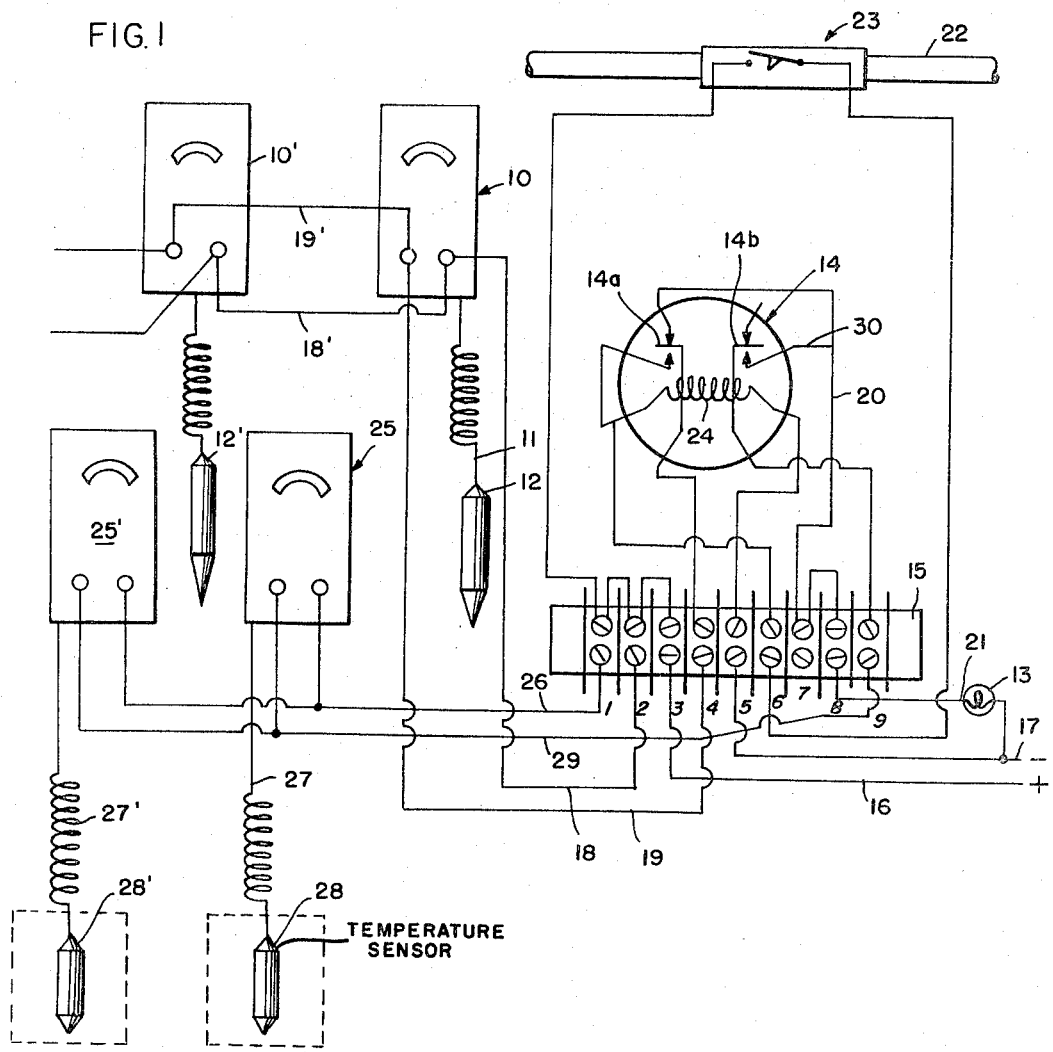
Figure 2:
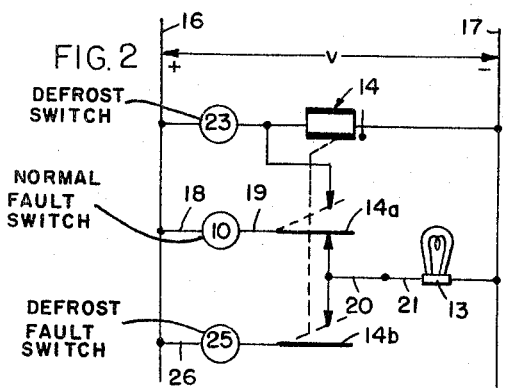

FIG. 1 is a wiring diagram and fragmentary piping diagram of apparatus embodying teachings of the invention; and FIG. 2 is a schematic wiring diagram used to further explain the operation of the showing in FIG. 1.

In the illustration given and with particular reference to FIG. 1, the numeral 10 designates generally a thermostat which is employed for "normal sensing." Such a thermostat is ordinarily located immediately adjacent a refrigerator case or box (not shown), and is connected by means of a conduit 11 to a temperature sensing element 12 generally located in the air space within the refrigerator case.

It is the function of the thermostat 10 to indicate (during normal operation) that the temperature within the case has risen above a predetermined value, i.e., 15° F. It will be appreciated that the invention has application to refrigeration systems embodying more than a single case, and, as shown in FIG. 1, a second thermostat 10' equipped with its own sensing bulb or element 12', may be used for this purpose.

The thermostat 10 acts in the nature of a switch to close a circuit to a remote signalling or warning device as at 13 in FIGS. 1 and 2. As shown in FIG. 1, the thermostat 10 is electrically connected with a relay generally designated 14 and a junction plate 15. However, for the sake of simplicity of explanation, reference may be made to FIG. 2 wherein voltage V is applied across the lines 16 and 17, with the thermostat 10, the relay arm 14a, and the signalling device 13 being arranged in series across the line voltage. Thus, in normal operation, should the sensing element 12 actuate the thermostat 10, the circuit is closed and the remote signalling device 13, which may be a flasher light, horn, etc., is energized to give a sensible warning of improper operation of the refrigerator.

To achieve this operation with the wiring arrangement shown in FIG. 1, 24-volt direct current flows from the line 16 into the junction plate 15 at position 3, then out of the junction plate along the line 18 to the thermostat 10. Return from the thermostat 10 is through the line 19, which enters the junction plate at position 4, flowing through the relay contact 14a and the line 20 to the junction position 7. The current thereafter flows out of the junction plate position 8 through the line 21 to the signalling or warning device 13 to the return or ground line 17.

For parallel operation of a plurality of refrigerator cases, the lines 18 and 19 are interconnected with additional cases as at 10' through the lines 18' and 19', respectively.

Defrosting operation

A normal defrosting operation can be performed by flowing heated refrigerant gas through a supply line to the coils in the cases associated with thermostats 10, 10', etc. A fragment of the supply line is designated 22 in FIG. 1, and it will be further seen (referring to the extreme upper righthand portion of FIG. 1) that a thermostat generally designated 23 is interposed in the supply line 22. The thermostat 23, like the thermostats 10 and 10', is normally open, and will be closed, i.e., actuated, by a rise in temperature. A suitable value of temperature for this purpose may be 22° F. It will be appreciated that the heated refrigerant gas will normally be well above 22° F. for defrosting purposes, so that the thermostat 23 reacts almost instantaneously to the initiation of a defrosting cycle.

Referring now to FIG. 2, it will be seen that actuation of the thermostat 23 results in sending current through the relay 14, more particularly, the coil 24 (see FIG. 1) of the relay 14. This results in moving the two contacts 14a and 14b from the solid line positions in FIG. 2 to the dotted line positions.

With the upper relay arm 14a in the dotted line position shown, it will be seen that the thermostat 10 is now disconnected from the warning device 13. This condition is initiated by the flow of current through the pipe thermostat 23 and the relay 14, more particularly, the relay coil 24.

At this time, however, the thermostat 10 is energized, i.e., closed, by virtue of the higher temperature within the refrigerator case during defrosting. This results in a flow of current through the thermostat 10 to the relay coil 24 and the relay 14 to "take over" when the pipe thermostat 23 becomes deenergized. Here, it will be appreciated that the virtually instantaneous reaction of the thermostat 23 will result in deactuation of this thermostat when the defrosting gas or other means is discontinued. At this particular time, however, the refrigerator case is usually well above the normal operating temperature. Thus, if the relay 14 were energized only by the thermostat 23, a warning signal would come on at the end of each defrosting cycle. This is avoided by interconnecting the relay coil 24 with the normal sensing thermostat 10 through the relay arm 14a.

The third thermostat shown in the drawing is designated generally by the numeral 25 and is seen to be connected to positive voltage by means of the line 26. Each override thermostat 25, 25', etc., is equipped with its own conduit 27 and sensing bulb 28, viz., 27' and 28' for the thermostat 25'. When the override thermostat closes, current is delivered through the line 29 to the ninth position on the junction plate 15 and to the relay arm 14b. The relay arm 14b is tied in to the line 20 by means of a line 30 so that actuation of the thermostat 25 results in energization of the warning device 13. Advantageously, the sensing element 28 of the override thermostat 25 may be encapsulated or insulated so as to provide a predetermined time delay in sensing an increased temperature within the refrigerator case. If, for example, the defrost cycle normally takes 10 minutes, the encapsulated temperature-sensing element 28, would be so insulated as to require about 15 minutes of being subjected to elevated temperatures within the refrigerator case before closing to operate the warning device 13. Thus, the override thermostat 25 functions only to provide a warning signal during the exceptional time of defrosting.

Summarizing the operation, the normally sensing thermostat 10 which is placed in the cooling chamber of a refrigerator case in the cool air stream, but not in contact with the cooling coils, closes its electrical contacts upon a temperature rise fault. This signal goes through one set of the normally close contacts of the relay to a signalling device 13 and alerts personnel of the fault. This is the normal sensing thermostat except during a defrost cycle.

The pipe thermostat 23 is for sensing of the heated gas during the defrost cycle. This thermostat is mounted on the feed pipe of the cooling coils. Upon temperature rise during the defrost cycle, the thermostat will close and energize the relay coil 24, which will block any signal from the normal sensing thermostat 10 to the signalling device 13. The closing of the contacts on the normal sensing thermostat 10 because of this temperature rise during defrosting, will then feed through a normally open set of contacts and hold the relay 14 energized through the duration of the defrost cycle and the return of the case to its normal temperature. The normal sensing thermostat 10 will then open its contacts, the relay 14 will return to its normal position, and be ready for monitoring any temperature fault after the case has come down to the operating temperature.

The thermostat 25 is an override thermostat for the sensing of abnormally long defrost cycles or malfunction of the cooling system. This is an encapsulated or time delay thermostat placed beside the thermostat 10 but not touching the cooling coils. The purpose of this thermostat is to sense any abnormally slow return of the system during defrosting to its normal temperature before the products within the refrigerator case can be damaged. The closing of the thermostat 25 will send a signal through another set of normally open contacts of the relay 14 which are closed during defrosting. This is also a fault signal which alerts personnel.

Encapsulating or insulating constitute advantageous means for accomplishing the foregoing results, although it will be appreciated by those skilled in the art that other means such as pneumatic electric or clock-type delayed timers may be used in certain instances.

While in the foregoing specification a detailed description of an embodiment of the invention has been set down for the purpose of illustration, many variations in the details herein given may be made by those skilled in the art without departing from the spirit and scope of the invention.

We claim:

1. In a monitoring system for a refrigerator equipped with defrosting means, a first circuit including a warning device for reporting a refrigerator interior temperature in excess of a predetermined value, a second circuit including a relay and means for operating said relay to render said warning device inoperative during defrosting, and a third circuit including means responsive to faulty operation of said refrigerator during defrosting for indicating said faulty operation, said second circuit relay including means for rendering said third circuit operative only during defrosting thereby precluding simultaneous operation of said first and third circuits in actuating said warning device.

2. In a monitoring system for a refrigerator equipped with defrosting means, a first electrical circuit including a first thermostat responsive to the interior temperature of the refrigerator for developing an electrical signal whenever a fault occurs during normal operation, said first circuit also including a warning device, a normally closed relay contact interposed in said first circuit between the thermostat thereof and said warning device, a second circuit electrically connected in said system and including a second thermostat responsive to the temperature of said defrosting means, said second circuit also including a relay coil serially connected with said second thermostat and adapted to open the normally closed contacts of said first circuit, and simultaneously close a normally-open circuit between said first thermostat and said relay coil thereby maintaining said relay coil energized by current flowing through said first circuit thermostat, a third circuit including an override thermostat electrically connected in said system, a set of normally open relay contacts interconnecting said third circuit thermostat and said warning device, actuation of said relay coil closing said third circuit relay contacts whereby said override thermostat is adapted to report a fault during defrosting.

3. The system of claim 2 in which said third circuit override thermostat is equipped with an encapsulated temperature-sensing element whereby a predetermined time delay is maintained during a defrosting cycle until said override thermostat is actuated.

4. In a monitoring system for a refrigerator equipped with defrosting means, first means including thermostat means for generating an alarm signal responsive to the temperature of the refrigerator interior exceeding a predetermined value and a warning device adapted to receive said alarm signal, second means for generating a defrost signal in response to the actuation of said defrosting means, switching means responsive to said defrost signal for switching said thermostat means out of circuit from said warning device and in circuit with itself, whereby said switching means is energized by said alarm signal, said switching means remaining operative as long as said thermostat means generates said alarm signal, said switching means switching said thermostat means back in circuit with said warning device when said alarm signal and said defrost signal are not being generated, and third means sensing faulty operation of said refrigerator only during defrosting and operative in response to said switching means for indicating said faulty operation.

References Cited by the Examiner

UNITED STATES PATENTS 3,136,137 6/1964 Crossley _____ 340—227

NEIL C. READ, Primary Examiner.

D. L. TRAFTON, Assistant Examiner.